United States Patent [19]

Mead

[11] Patent Number: 5,159,441
[45] Date of Patent: Oct. 27, 1992

[54] FLYING SPOT TELECINE AND METHOD OF OPERATING SAME

[75] Inventor: Terence W. Mead, Hertford, Great Britain

[73] Assignee: Rank Cintel Limited, England

[21] Appl. No.: 650,296

[22] Filed: Feb. 4, 1991

[30] Foreign Application Priority Data

Feb. 2, 1990 [GB] United Kingdom ............... 9002362

[51] Int. Cl.⁵ .............................................. H04N 9/110
[52] U.S. Cl. ........................................ 358/27; 358/54; 358/214
[58] Field of Search ............................. 358/214–217, 358/237, 97, 54, 75, 80, 27, 29, 332, 244.2, 348

[56] References Cited

U.S. PATENT DOCUMENTS

| | | | |
|---|---|---|---|
| 4,151,560 | 4/1979 | Zinchuk | 358/214 |
| 4,597,006 | 6/1986 | Orsburn | 358/80 |
| 5,049,984 | 9/1991 | Moore | 358/54 |

FOREIGN PATENT DOCUMENTS 1064486  4/1967  United Kingdom .
2215551A 9/1989  United Kingdom .

OTHER PUBLICATIONS

K. M. Trampel and H. H. Jensen, Calibration of Photographic Scanning System, IBM Technical Disclosure Bulletin.

Primary Examiner—James J. Groody
Assistant Examiner—Sherrie Hsia
Attorney, Agent, or Firm—Ostrolenk, Faber, Gerb & Soffen

[57] ABSTRACT

A flying spot telecine includes a control processor for generating and storing a MINIMUM GAIN REFERENCE value representing a minimum gain of each of a plurality of PMT sections which detect light transmitted by a film strip that is being scanned by a light spot. The control processor also generates and stores a MAXIMUM GAIN REFERENCE value representing a maximum gain of each of the plurality of PMT sections. A system gain control provides control signals to the plurality of PMT sections to control the voltage applied thereto. During subsequent operation of the telecine to modify control signals provided to each of the plurality of PMT sections dependent upon the stored MINIMUM GAIN REFERENCE and MAXIMUM GAIN REFERENCE value for the respective one of the plurality of PMT sections independently of the control signals provided to the others of the plurality of PMT sections.

14 Claims, 1 Drawing Sheet

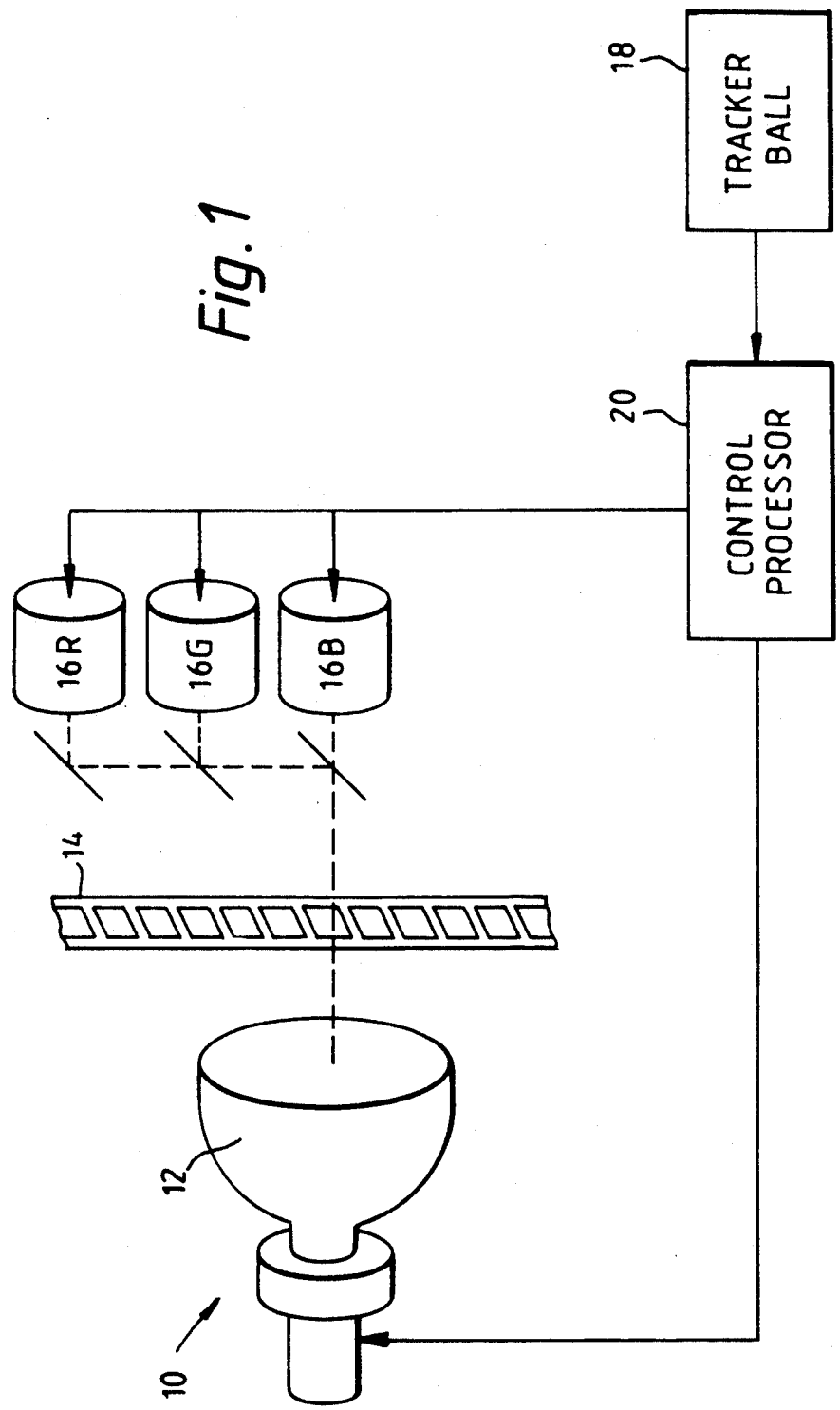

FLYING SPOT TELECINE AND METHOD OF OPERATING SAME

FIELD OF THE INVENTION

The present invention relates to photo-multiplier tube (PMT) tracking in telecines.

In a flying spot telecine, three or more PMTs are generally used to convert the light transmitted by cinematographic film running through the telecine into electrical signals which are processed to form a final video signal. It is a common practice to adjust the gain of the system as a whole by manipulating the voltages applied to the PMTs using potentiometers or the like. To avoid changes in the colour of the picture reproduced from the video signal output by the telecine, it is necessary to 'track' the voltages applied to the individual PMTs so that the ratios between the gains of the PMTs remain as near constant as possible.

Related Prior Art

One known method of PMT tracking involves the use of two preset potentiometers for each PMT to adjust the voltage applied to the PMT at each end of the gain control range. This requires manual adjustment for each different film gauge used and for positive or negative operation.

SUMMARY OF THE INVENTION

In accordance with the invention, there is provided a method of photomultiplier tube ('PMT') tracking in a flying spot telecine having cathode ray tube ('CRT') means for generating a light spot for scanning a film strip, at least one PMT means for detecting light transmitted by the said film strip, and system gain control means for providing a control signal to the PMT means to control the voltage applied thereto; the method comprising:

(a) generating a MINIMUM GAIN REFERENCE value representing a minimum gain of the PMT means and storing said value in control processor means;

(b) generating a MAXIMUM GAIN REFERENCE value representing a maximum gain of the PMT means and storing said value in the control processor means; and, (c) during subsequent operation of the telecine modifying the control signal provided to the PMT means in dependence on the stored MIMIMUM GAIN REFERENCE and MAXIMUM GAIN REFERENCE values. In a preferred embodiment of the method of the invention (i) a control signal is provided to the PMT means;

(ii) the output of the PMT is compared to a reference level; and (iii) the control signal is incremented or decremented according to whether the PMT output exceeds the reference level;

(iv) steps (i) to (iii) are repeated a predetermined plurality of times; and (v) the final control signal value is stored as the MINIMUM or MAXIMUM GAIN REFERENCE value.

In a further aspect, the invention provides a flying spot telecine having cathode ray tube ('CRT') means for generating a light spot for scanning a film strip, at least one PMT means for detecting light transmitted by the said film strip, and system gain control means for providing a control signal to the PMT means to control the voltage applied thereto; the telecine including control processor means operable to (a) generate a MINIMUM GAIN REFERENCE value representing a minimum gain of the PMT means and to store said value (b) generate a MAXIMUM GAIN REFERENCE value representing a maximum gain of the PMT means and to store said value; and, (c) during subsequent operation of the telecine to modify the control signal provided to the PMT means in dependence on the stored MIMIMUM GAIN REFERENCE and MAXIMUM GAIN REFERENCE values.

BRIEF DESCRIPTION OF THE DRAWING

A preferred method in accordance with the invention will now be described in detail, by way of example, with reference to the drawing which illustrates schematically telecine equipment in which the method of the invention is utilized.

DETAILED DESCRIPTION OF THE DRAWING

The telecine shown in the drawings includes cathode ray tube ('CRT') means 12 for generating a light spot which scans a film strip 14 passing through the telecine. Light transmitted by the film strip 14 is collected by photomultiplier tubes ('PMTs') $16_R$, $16_G$ and $16_B$ which monitor the red, green and blue levels, respectively. The output signals from the PMTs $16_R$, $16_G$ and $16_B$ are processed separately.

The master gain control 18 for the system as a whole is a trackerball system which provides a range of digital numbers to a control processor 20. The processor 20 then scales the numbers provided by the trackerball system according to reference values stored in memory associated with processor 20. The resulting values are converted into analogue voltages which are applied to the PMT supply controls to control the individual device gains of the PMTS.

Before being used for the first time, the PMT tracking must be aligned so as to avoid variations in colour in the digital video signal produced by the telecine 10 due to variations in the relationship between applied voltage and device gain as between the three PMTs. To align the system, the operator removes any film present from the light path. The CRT beam current is then set to its normal operating value and the PMT control number provided by the trackerball is set to provide the lowest operating voltage at the PMT. The digital video signal derived from the PMT output is then compared with the required peak level of the video signal over a scan of one whole frame. If at any point during the scan, the video signal level exceeds the required video level, then the PMT control number from the trackerball system is decremented and the comparison between the video signal level and the required peak level over a frame scan is repeated.

If the digital video signal level does not exceed the required peak level, the PMT control number is incremented and the comparison repeated.

The comparison over a frame scan is repeated 128 times incrementing or decrementing the PMT control number by 32 LSBs (least significant bits) and then 128 times more using increments of one LSB. The final number is then stored as MINIMUM GAIN REFER- ENCE in the memory associated with the control processor 20.

It will be noted that successive approximation techniques are not used because of the possibility of overloading the PMTs and the need for noise averaging. The comparisons are performed separately but simultaneously for all three PMTs $16_R$, $16_G$ and $16_B$.

The whole comparison procedure outlined above is then repeated with the CRT beam current set to a value which corresponds to the maximum film density used, typically, at one tenth its normal value (this is equivalent to film of highlight density N.D.1.0.). The resulting number is then stored in the memory associated with the control processor 20 as the MAXIMUM GAIN REFERENCE.

Thus, for telecine equipment 10 utilizing three PMTs $16_R$, $16_G$ and $16_B$, six values are stored in the control processor memory; MINIMUM GAIN REFERENCE and MAXIMUM GAIN REFERENCE for each of the three PMTs. It is envisaged that the comparison procedures described above will be carried out entirely automatically under the control of the processor 20.

During subsequent operation of the telecine, the control numbers provided by the trackerball system 18 are adjusted in scale and offset by the control processor 20 to correspond in range to the scale defined by the MINIMUM GAIN REFERENCE and MAXIMUM GAIN REFERENCE values stored for each PMT. The scale is assumed to be linear between these values but could, of course, also follow some predetermined curve.

Thus, the PMT voltages are tracked automatically as the master gain control is used to provide varying PMT control numbers. As a result variations in system control provide similar effects on all three colours regardless of individual light levels and PMT sensitivities.

Although the present invention has been described in connection with a preferred embodiment thereof, many other variations and modifications will now become apparent to those skilled in the art. It is preferred therefore, that the present invention be limited not by the specific disclosure herein, but only by the appended claims.

What I claim is:

1. A method of photo-multiplier tube ('PMT') tracking in a flying spot telecine having cathode ray tube ('CRT'), means for generating a light spot for scanning a film strip, a plurality of PMT means for detecting light transmitted by said film strip, and system gain control means for providing control signals to the plurality of PMT means to control the voltage applied thereto; the method comprising:
   (a) generating a MINIMUM GAIN REFERENCE value representing a minimum gain of the PMT means and storing said value in control processor means for each of said plurality of PMT means;
   (b) generating a MAXIMUM GAIN REFERENCE value representing a maximum gain of the PMT means and storing said value in the control processor means for each of said plurality of PMT means; and,
   (c) during subsequent operation of the telecine modifying the control signals provided to the each of the plurality of PMT means in dependence on the stored MINIMUM GAIN REFERENCE and MAXIMUM GAIN REFERENCE values for the respective one of said plurality of PMT means independently of the control signals provided to the others of the plurality of PMT means.

2. The invention set forth in claim 1 wherein said control signals provided to each PMT means is scaled according to a scale the end points of which are defined by the MINIMUM GAIN REFERENCE value and the MAXIMUM GAIN REFERENCE value for said respective PMT means.

3. The invention set forth in claim 2 wherein said scale is a linear scale.

4. The invention set forth in claim 1 wherein;
   (i) a control signal is provided to each said PMT means;
   (ii) the output of the PMT means is compared to a reference level; and
   (iii) the control signal is incremented or decremented according to whether the PMT output exceeds the reference level;
   (iv) steps (i) to (iii) are repeated a predetermined plurality of times; and
   (v) the final control signal value is stored as the MINIMUM or MAXIMUM GAIN REFERENCE value.

5. The invention set forth in claim 4 wherein steps (i) to (iii) are repeated a first plurality of times incrementing or decrementing the control signal by a first incremental value and a second plurality of times incrementing or decrementing the control signal by a second incremental value less than the first incremental value.

6. The invention set forth in claim 4 in which steps (i) to (v) are carried out with the CRT means beam current set at a normal operating value and the control signal set initially at a value corresponding to the minimum operating voltage applied to the PMT means, to generate the MINIMUM GAIN REFERENCE value.

7. The invention set forth in claim 6 in which steps (i) to (v) are carried out with the CRT means beam current set at a value corresponding to maximum film density and the control signal set initially at a value corresponding to the minimum operating voltage applied to the PMT means, to generate the MAXIMUM GAIN REFERENCE value.

8. A flying spot telecine comprising cathode ray tube ('CRT') means for generating a light spot for scanning a film strip;
   a plurality of PMT means for detecting light transmitted by said film strip; and
   system gain control means for providing control signals to the plurality of PMT means to control the voltage applied thereto;
   said telecine further comprising control processor means operable to
      (a) generate a MINIMUM GAIN REFERENCE value representing a minimum gain of each of said plurality of PMT means and to store said value;
      (b) generate a MAXIMUM GAIN REFERENCE value representing a maximum gain of each of said plurality of PMT means and to store said value; and,
      (c) during subsequent operation of the telecine to modify the control signals provided to each of said plurality of PMT means in dependence on the stored MINIMUM GAIN REFERENCE and MAXIMUM GAIN REFERENCE values for the respective one of said plurality of PMT means, independently of the control signals provided to the others of the plurality of PMT means.

9. The invention set forth in claim 8 in which the control signals provided to each of said plurality of PMT means is scaled according to a scale the end points of which are defined by the MINIMUM GAIN REFERENCE value and the MAXIMUM GAIN REFERENCE value for the respective one of said plurality of PMT means.

10. The invention set forth in claim 9 in which the scale is a linear scale.

11. The invention set forth in claim 8 wherein (i) a control signal is provided to one of said plurality of PMT means by the control processor means;

(ii) the output of said PMT means is compared to a reference level; and (iii) the control signal is incremented or decremented according to whether the PMT output exceeds the reference level;

(iv) steps (i) to (iii) are repeated a predetermined plurality of times; and (v) the final control signal is stored by the control processor means as the MINIMUM or MAXIMUM GAIN REFERENCE value.

12. The invention set forth in claim 11 in which steps (i) to (iii) are repeated a first plurality of times incrementing or decrementing the control signal by a first incremental values and a second plurality of times incrementing or decrementing the control signal by a second incremental value less than the first incremental value.

13. The invention set forth in claim 11 in which steps (i) to (v) are carried out with the CRT means beam current set at a normal operating value and the control signal set initially at a value corresponding to the minimum operating voltage applied to the PMT means, to generate the MINIMUM GAIN REFERENCE VALUE.

14. The invention set forth in claim 11 wherein steps (i) to (v) are carried out with the CRT means beam current set at a value corresponding to maximum film density and the control signal set initially at a value corresponding to the minimum operating voltage applied to the PMT means, to generate the MAXIMUM GAIN REFERENCE VALUE.

* * * * *